(12) United States Patent
Han et al.

(10) Patent No.: US 9,112,904 B2
(45) Date of Patent: Aug. 18, 2015

(54) SYSTEM AND METHOD FOR SHARING DLNA NETWORK INFORMATION

(71) Applicant: Samsung Electronics Co., Ltd., Gyeonggi-do (KR)

(72) Inventors: Sang-Jin Han, Gyeonggi-do (KR); Ju-Bong Lee, Gyeonggi-do (KR); Seol-Hwa Lee, Gyeonggi-do (KR); Hyung-Min Kim, Gyeonggi-do (KR); Jong-Hyuk Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 165 days.

(21) Appl. No.: 13/627,340

(22) Filed: Sep. 26, 2012

(65) Prior Publication Data

US 2013/0086168 A1    Apr. 4, 2013

(30) Foreign Application Priority Data

Sep. 30, 2011    (KR) .................. 10-2011-0099822

(51) Int. Cl.
*G06F 15/16*    (2006.01)
*H04L 29/08*    (2006.01)
*H04L 12/28*    (2006.01)
*H04W 4/02*    (2009.01)

(52) U.S. Cl.
CPC ............ *H04L 67/16* (2013.01); *H04L 12/2807* (2013.01); *H04L 12/2812* (2013.01); *H04L 67/02* (2013.01); *H04L 67/025* (2013.01); *H04W 4/021* (2013.01)

(58) Field of Classification Search
USPC ......... 709/201, 202, 203, 204, 205, 206, 207, 709/217, 218, 219, 227, 228, 229, 230, 238, 709/245, 246, 248; 370/331, 389, 338; 455/422.1; 726/28
See application file for complete search history.

(56) References Cited

U.S. PATENT DOCUMENTS

| | | | |
|---|---|---|---|
| 8,583,732 B2 * | 11/2013 | Bae et al. ...................... | 709/204 |
| 2007/0211734 A1 | 9/2007 | Yang et al. | |
| 2007/0237115 A1 * | 10/2007 | Bae et al. ...................... | 370/331 |
| 2007/0258474 A1 | 11/2007 | Kim et al. | |
| 2009/0092133 A1 * | 4/2009 | Mok et al. ..................... | 370/389 |
| 2009/0177971 A1 | 7/2009 | Kim et al. | |
| 2009/0287802 A1 * | 11/2009 | Koistinen et al. .............. | 709/221 |
| 2010/0165957 A1 * | 7/2010 | Hegde et al. .................. | 370/338 |
| 2010/0281093 A1 | 11/2010 | Poder et al. | |
| 2011/0131518 A1 * | 6/2011 | Ohashi .......................... | 715/769 |
| 2011/0294515 A1 * | 12/2011 | Chen et al. ................. | 455/456.1 |
| 2011/0307376 A1 * | 12/2011 | Woxblom ....................... | 705/39 |
| 2012/0151006 A1 * | 6/2012 | McInerney et al. ........... | 709/219 |
| 2012/0209960 A1 * | 8/2012 | Harwell et al. ................ | 709/217 |

FOREIGN PATENT DOCUMENTS

| | | |
|---|---|---|
| JP | 2002351369 | 12/2002 |
| KR | 1020070048922 | 5/2007 |

* cited by examiner

*Primary Examiner* — Saket K Daftuar
(74) *Attorney, Agent, or Firm* — The Farrell Law Firm, P.C.

(57) ABSTRACT

A system and method for sharing Digital Living Network Alliance (DLNA) network information is provided. The system includes a first mobile terminal that collects information about a DLNA network having a radio radius in which the first mobile terminal is located, and transmits the information about the DLNA network to a web server. The web server manages the information about the DLNA network received from the first mobile terminal, and shares the information about the DLNA network with a second mobile terminal, which is located outside of the radio radius of the DLNA network, via an Internet connection.

20 Claims, 7 Drawing Sheets

SYSTEM AND METHOD FOR SHARING DLNA NETWORK INFORMATION

PRIORITY

This application claims priority under 35 U.S.C. §119(a) to Korean Patent Application Serial No. 10-2011-0099822, which was filed in the Korean Intellectual Property Office on Sep. 30, 2011, the entire content of which is incorporated herein by reference.

BACKGROUND OF THE INVENTION

1. Field of the Invention

The present invention relates to a system and method for sharing information about a Digital Living Network Alliance (DLNA) network.

2. Description of the Related Art

The DLNA is a non-profit collaborative trade organization, which is responsible for defining interoperability guidelines to enable sharing of digital media between consumer appliances such as Personal Computers (PCs), printers, cameras, cell phones, Set Top Boxes (STBs), TeleVisions (TVs), and other multimedia devices. Basically, the DLNA guidelines are used in order to achieve interoperability between appliances in a home network.

Generally, DLNA network appliances share content via a Wireless Fidelity (WiFi) Access Point (AP). The DLNA network appliances indicate appliances mounting DLNA middleware. The WiFi AP assigns an Internet Protocol (IP) address for each appliance based on Dynamic Host Configuration Protocol (DHCP). The DLNA network appliances can communicate with one another through Universal Plug and Play (UPnP) protocol, and can share content with other appliances over the Internet.

Generally, after a terminal user searches an accessible WiFi AP, the terminal user can access a Digital Media Server (DMS) of a corresponding DLNA network via the searched WiFi AP. The DMS stores and provides content.

However, in a conventional system, the terminal user must be positioned within a radio radius of the WiFi AP in order to identify and access the DMS of the DLNA network. As a result, if the terminal user is positioned out of the radio radius of the WiFi AP, the terminal user cannot identify the WiFi AP, making it difficult to gain access to the DMS of the DLNA network.

SUMMARY OF THE INVENTION

The present invention is designed to addresses at least the above-described problems and/or disadvantages occurring in the prior art, and to provide at least the advantages below.

Accordingly, an aspect of the present invention is to provide a system and method that enable terminal users to share information about a corresponding DLNA network without geographical limits.

Another aspect of the present invention is to provide a system and method in which a terminal user who is positioned in an area where a DMS of a corresponding DLNA network cannot be directly identified, receives information about the DMS of the DLNA network through the Internet.

Another aspect of the present invention is to provide a system and method for posting a DMS address of a DLNA network on the web, thereby allowing other terminal users to access the DMS address.

Another aspect of the present invention is to provide a system and method for linking information of a corresponding DLNA network (e.g., location information, DMS information, and content information) and user opinions (hereinafter, social information) about the DLNA network.

In accordance with an aspect of the present invention, a system for sharing DLNA network information is provided. The system includes a first mobile terminal that collects information about a DLNA network having a radio radius in which the first mobile terminal is located, and transmits the information about the DLNA network to a web server; and the web server that manages the information about the DLNA network received from the first mobile terminal, and shares the information about the DLNA network with a second mobile terminal, which is located outside of the radio radius of the DLNA network, via an Internet connection.

In accordance with another aspect of the present invention, a system for sharing DLNA network information is provided. The system includes a first mobile terminal that uploads a post including information about a DLNA network having a radio radius in which the first mobile terminal is located, to a web server; and the web server that collects social information about the post received from the first mobile terminal, and manages the post and the social information.

In accordance with another aspect of the present invention, a method for sharing DLNA network information is provided. The method includes collecting, by a first mobile terminal, information about a DLNA network having a radio radius in which the first mobile terminal is located; transmitting the information about the DLNA network to a web server; and sharing, by the web server, the information about the DLNA network with a second mobile terminal, which is located outside of the radio radius of the DLNA network, via an Internet connection.

BRIEF DESCRIPTION OF THE DRAWINGS

The above and other aspects, features, and advantages of certain embodiments of the present invention will become more apparent from the following detailed description when taken in conjunction with the accompanying drawings, in which.

DETAILED DESCRIPTION OF THE PREFERRED EMBODIMENTS

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In accordance with an embodiment of the present invention, a system is provided that enables terminal users to share information about a corresponding DLNA network over the Internet without geographical limits. Specifically, the existence of a DMS of a DLNA network is shared over the Internet. For example, if a DMS address of the DLNA network is posted on the web, terminal users with Internet capabilities can access the posted DMS address.

Figure 1:
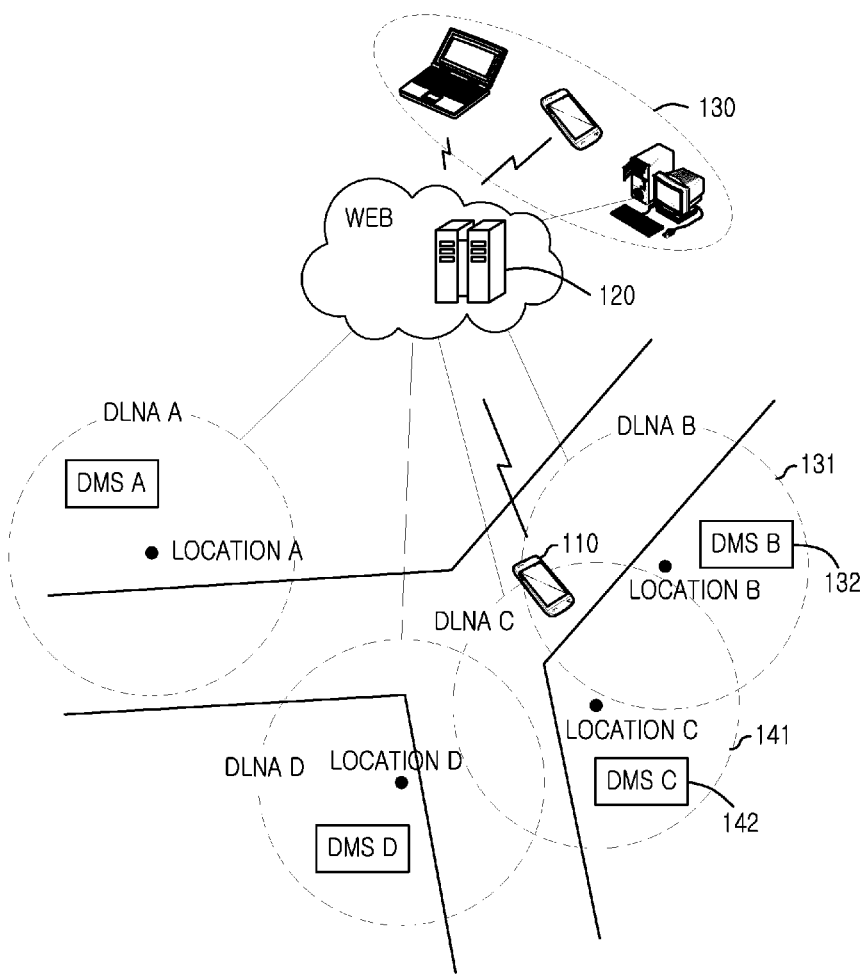
FIG. 1 illustrates a system for sharing content of a Digital Living Network Alliance (DLNA) network according to an embodiment of the present invention.

FIG. 1 illustrates a system for sharing content of a DLNA network according to an embodiment of the present invention.

Referring to FIG. 1, the content sharing system includes a mobile terminal 110 and a web server 120, which wirelessly communicate with each other. Specifically, the mobile terminal 110 identifies an accessible WiFi AP of a DLNA network at a current location. The identified WiFi AP indicates that the mobile terminal 110 is located within the radio radius of the WiFi AP. The mobile terminal 110 participates in the DLNA network via the WiFi AP access.

The mobile terminal 110 and appliances of the DLNA network are an IP addresses based on DHCP, and communicate through UPnP protocol.

The DLNA network includes a DMS, a Digital Media Player (DMP), a Digital Media Renderer (DMR), and a Digital Media Control (DMC). The DMS stores and manages content, and provides the content to connected terminals. The DMP receives content from the DMS or a DMS-mount terminal and reproduces the content. The DMC uploads or downloads content to or from the DMS-mount terminal. The DMR controls the DMC to receive content from the DMS and reproduce the content. The DMP may include the DMR and the DMC.

Each DLNA network can construct a plurality of DMSs, and the mobile terminal 110 can communicate with an opened, i.e., access-granted DMS. In FIG. 1, DMS A, DMS B, DMS C, and DMS D are opened DMSs granting access.

The mobile terminal 110 is located within a radio radius 131 of a DLNA B network, such that the mobile terminal 110 can identify the DMS B 132 of the DLNA B network. The mobile terminal 110 is also located within the radio radius 141 of a DLNA C network, such that the mobile terminal 110 can also identify the DMS C 142 of the DLNA C network. Basically, the mobile terminal 110 identifies DMS B 132 and DMS C 142 as access objects and may access both the DMS B 132 and DMS C 142.

However, when the mobile terminal 110 is not located in the radio radius of a DLNA network, i.e., DLNA A and DLNA D, the mobile terminal 110 cannot identify either of DMS A or DMS D, and therefore, cannot identify these DMSs as potential access objects.

The mobile terminal 110 collects and stores information about a DLNA network in which the mobile terminal 110 is participating in a current location, and transmits this information to the web server 120. The information about the DLNA networks includes location information, DMS information, content information, etc.

Figure 2:
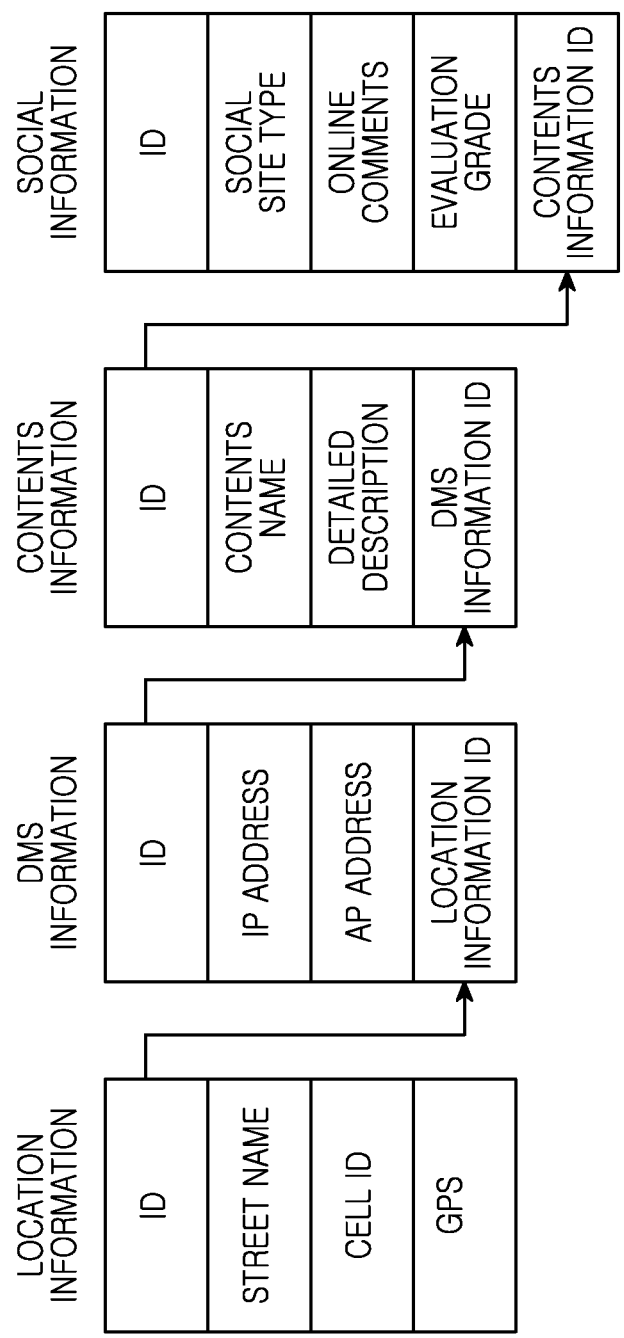
FIG. 2 illustrates a storage configuration for information about a corresponding DLNA network in a storage unit of a mobile terminal or a web server in a DLNA-network information sharing system according to an embodiment of the present invention.

FIG. 2 illustrates a storage configuration for information about a corresponding DLNA network in a storage unit of a mobile terminal or a web server in a DLNA-network information sharing system according to an embodiment of the present invention.

Referring to FIG. 2, the mobile terminal 110 or web server 120 links location information of a DLNA network, DMS information, and content information, and stores the linked information. Additionally, the web server 120 maps opinions (hereinafter, social information) of terminal users about a DMS and content (e.g., an online comment, a grade), to the DLNA network information, and stores the mapping result.

The location information includes a street name, cell IDentifier (ID), GPS information, and the like. The DMS information links with the location information, and includes an IP address, an AP address, and the like. Further, the content information links with the DMS information, and includes a content list (not shown), content names, a detailed description of the content, and the like. Furthermore, the social information links with the DMS information or the content information, and includes a social site type, an online comment, a grade, etc. Additionally, the location information, the DMS information, the content information, and the social information are granted inherent IDs, managed, and linked with each other. Accordingly, users of terminals 130 can search the stored DLNA network information via the Internet.

For example, the web server 120 presents a DMS, which is located in a corresponding area, on a map with reference to the corresponding location information, DMS information, content information, and social information. If different information about a corresponding DLNA network is uploaded, the web server 120 updates the stored information using the uploaded information.

As illustrated in FIG. 1, in the DLNA-network information sharing system, a user of the mobile terminal 110 may post information about the DLNA network to the web server 120. For example, the web server 120 sets up a web site capable of registering this posting. More specifically, the web server 120 receives a post, after receiving a request for posting registration from the mobile terminal 110, and then grants an identification number for the post, creates an address for the post, and registers the post to a posting board.

For example, the post may be the introduction of a content of notifying a HyperText Transfer Protocol (HTTP)—based Uniform Resource Locator (URL) address for the DMS or content.

The mobile terminal 110 can acquire the URL address for the DMS by transmitting a physical address of the DMS to the web server 120. The web server 120 assigns a URL address (or an IP address) mapped to the physical address and transmits the URL address to the mobile terminal 110.

The web server 120 connects and manages the post and the corresponding DLNA network information and social information. The web server 120 permits the users of the terminals 130 to input the social information, such as an online comment, a grade, etc., to the post. For example, the social information may be an index showing a user's preference or satisfaction for the post, or an index showing a preference or satisfaction for a corresponding DLNA network.

As described above, the web server 120 may set up one or more web sites (e.g., Social Network Services (SNSs)) that share the DLNA network information. Accordingly, the DLNA-network information sharing system supports communication between the mobile terminal 110 and the web server 120 through an access service such as a HyperText Markup Language (HTML) page, an open Application Programming Interface (API), etc.

Figure 3:
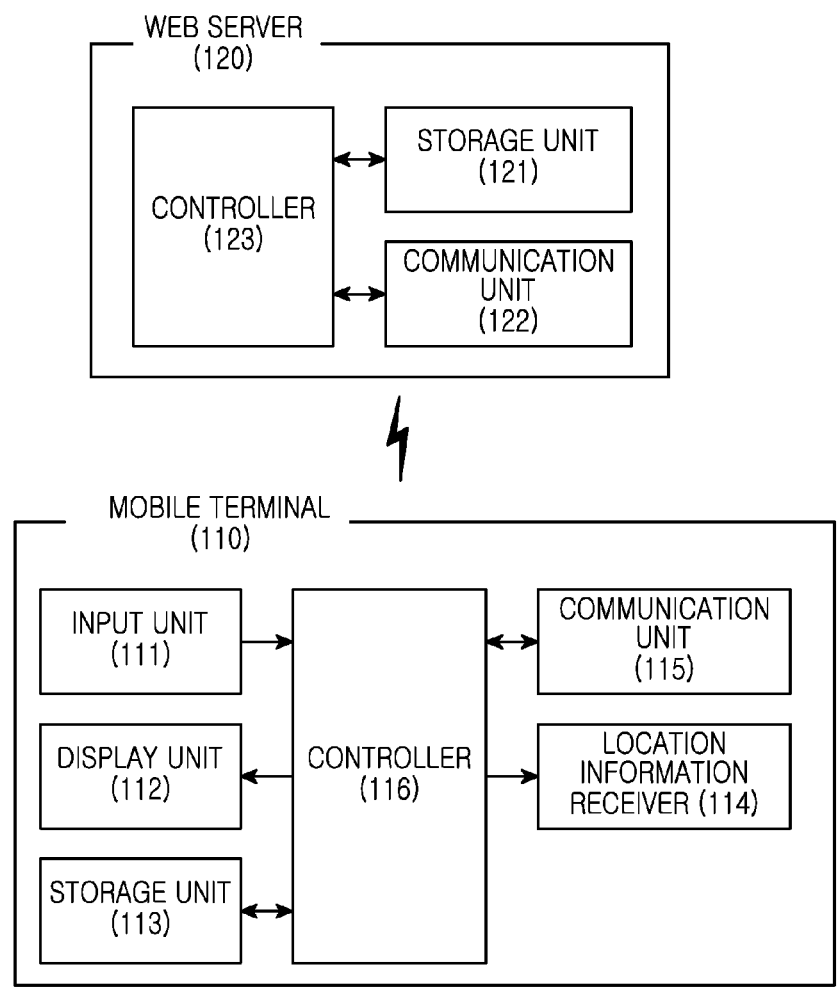
FIG. 3 is a block diagram illustrating a mobile terminal and a web server according to an embodiment of the present invention.

FIG. 3 is a block diagram illustrating a mobile terminal and a web server according to an embodiment of the present invention.

Referring to FIG. 3, the mobile terminal 110 includes an input unit 111 for user input, a display unit 112 for outputting display data, a storage unit 113 for storing data, a location information receiver 114 for receiving location information, a communication unit 115 for exchanging wireless signals, and a controller 116 for controlling operation of the mobile terminal 110. The input unit 111 includes hardware or software buttons, and outputs an input signal received through these buttons to the controller 116. The display unit 112, e.g., a Liquid Crystal Display (LCD), displays display data corresponding to an input signal according to the control of the controller 116. The storage unit 113, i.e., a memory, stores control programming and data input/output when the mobile terminal is 20 operated. The location information receiver 114 receives GPS information and cell ID information, and outputs the information to the controller 116. The controller 116 identifies a position of the mobile terminal 110 from the information. The controller 116 provides information of a DLNA network accessible at a current location to a web server 120.

The web server 120 includes a storage unit 121 for data, a communication unit 122 for exchanging wireless signals, and a controller 123 for controlling the operation of the web server 120. The controller 123 communicates with the mobile terminal 110 through the communication unit 122, and acquires and manages information about a corresponding DLNA network.

Figure 4:
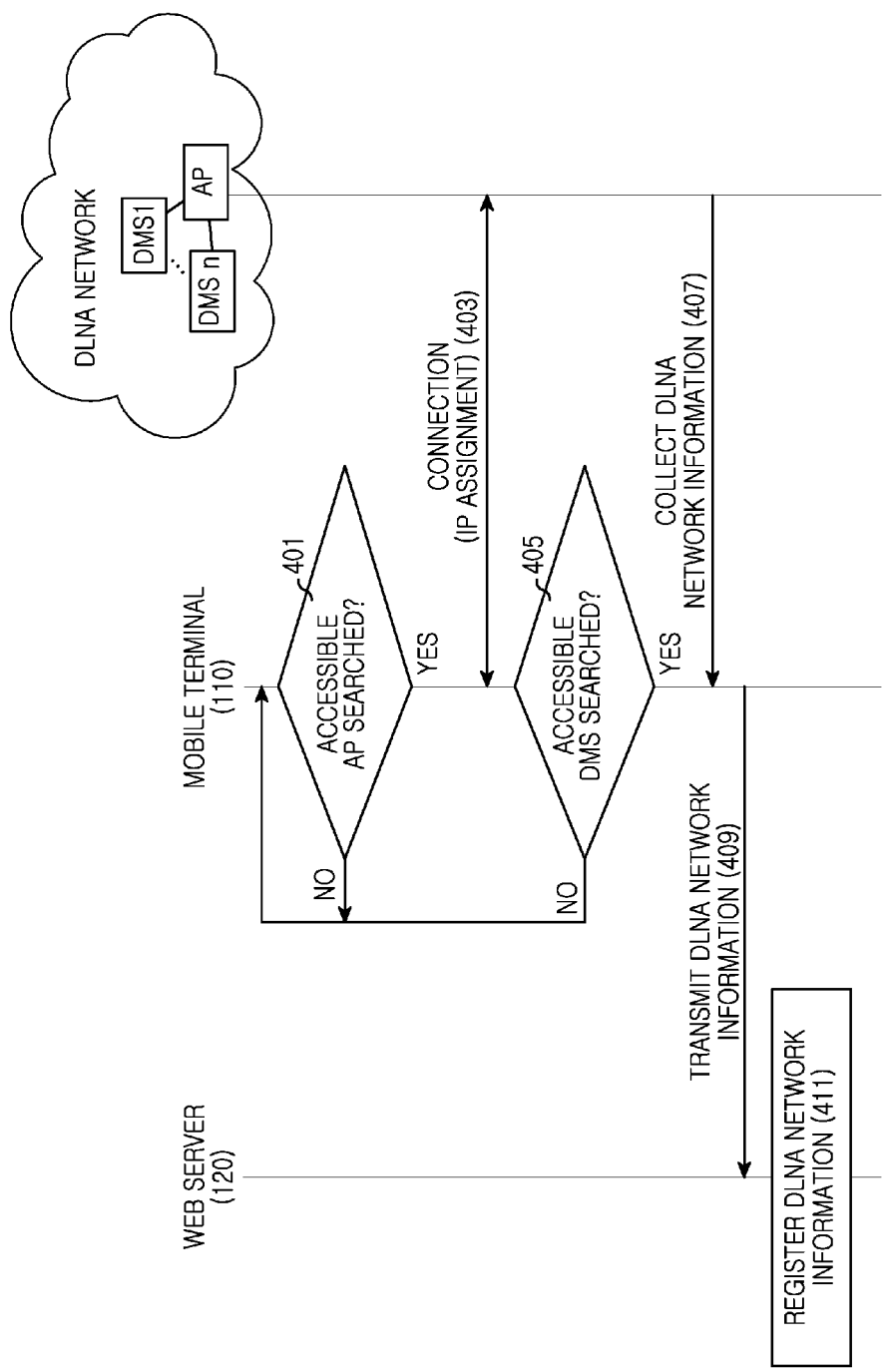
FIG. 4 illustrates communication in a DLNA-network information sharing system according to an embodiment of the present invention.

FIG. 4 illustrates communication in a DLNA-network information sharing system according to an embodiment of the present invention.

Referring to FIG. 4, in step 401, the mobile terminal 110 searches for an accessible AP of a DLNA network. If an accessible AP is located, the mobile terminal 110 is assigned an IP address to participate in the DLNA network from the AP in step 403.

In step 405, the mobile terminal 110 searches for an accessible DMS in the DLNA network. If the accessible DMS granting is identified, the mobile terminal 110 collects information about the DLNA network in step 407,. For example, the information of the DLNA network includes location information, DMS information, content information, etc. The mobile terminal 110 can acquire the location information directly, or acquire the location information from the DLNA network. If no accessible DMS is identified, the mobile terminal 110 performs step 401 and its subsequent steps, and attempts to participate in another DLNA network.

In step 409, the mobile terminal 110 transmits the collected DLNA network information to the web server 120.

In step 411, the web server 120 registers the DLNA network information received from the mobile terminal 110.

As described above, while participating in the DLNA network, the mobile terminal 110 collects the DLNA network information, and provides the collected DLNA network information to the web server 120. If the DLNA network information changes, the mobile terminal 110 transmits the changed DLNA network information to the web server 120, and the web server 120 updates the stored the DLNA network information.

Figure 5:
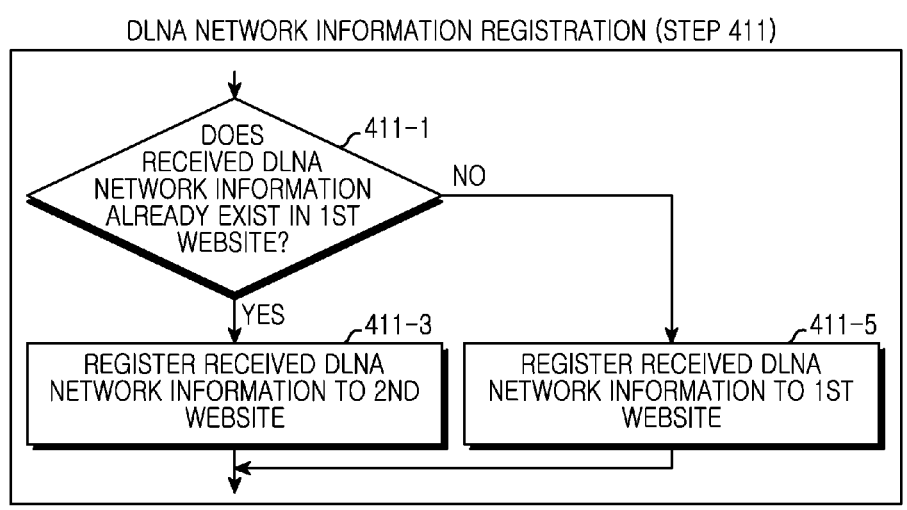
FIG. 5 is a flowchart illustrating a procedure for registering DLNA network information in a web server of a DLNA-network information sharing system according to an embodiment of the present invention.

FIG. 5 is a flowchart illustrating a procedure for registering DLNA network information in a web server of a DLNA-network information sharing system according to an embodiment of the present invention. Specifically, FIG. 5 provides a more detailed description of step 411, as illustrated in FIG. 4.

Referring to FIG. 5, in step 411-1, the web server 120 checks if received DLNA network information already exists in a 1st web site. When the received DLNA network information already exists in the 1st web site, the web server 120 registers the received DLNA network information to a 2nd web site in step 411-3. However, when the received DLNA network information does not exist in the 1st web site, the web server 120 registers the received DLNA network information to the 1st web site in step 411-5.

Figure 6:
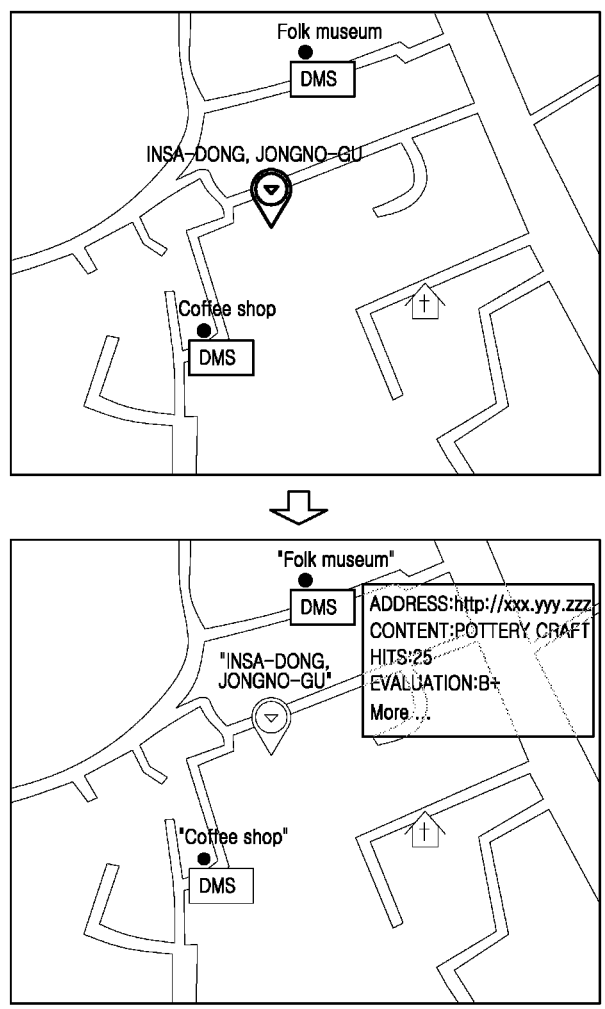
FIG. 6 illustrates screens displayed as a terminal searches a DMS located in a corresponding area according to an embodiment of the present invention.

FIG. 6 illustrates a diagram for a web screen on which a terminal searches a DMS according to an embodiment of the present invention.

Referring to FIG. 6, one of the terminals 130, which are not located in a radio radius of a DLNA network, accesses a web site and requests to search for a DMS located in a corresponding area. With reference to DLNA network information stored in the web server 120, the web site shows a search area with a map indicating DMS positions located on the map. The web site provides information of an address for each DMS, content, etc.

Further, with reference to social information linked to the DLNA network information stored in the web server 120, the web site provides social information, e.g., an evaluation grade, about the searched DMS.

Figure 7:
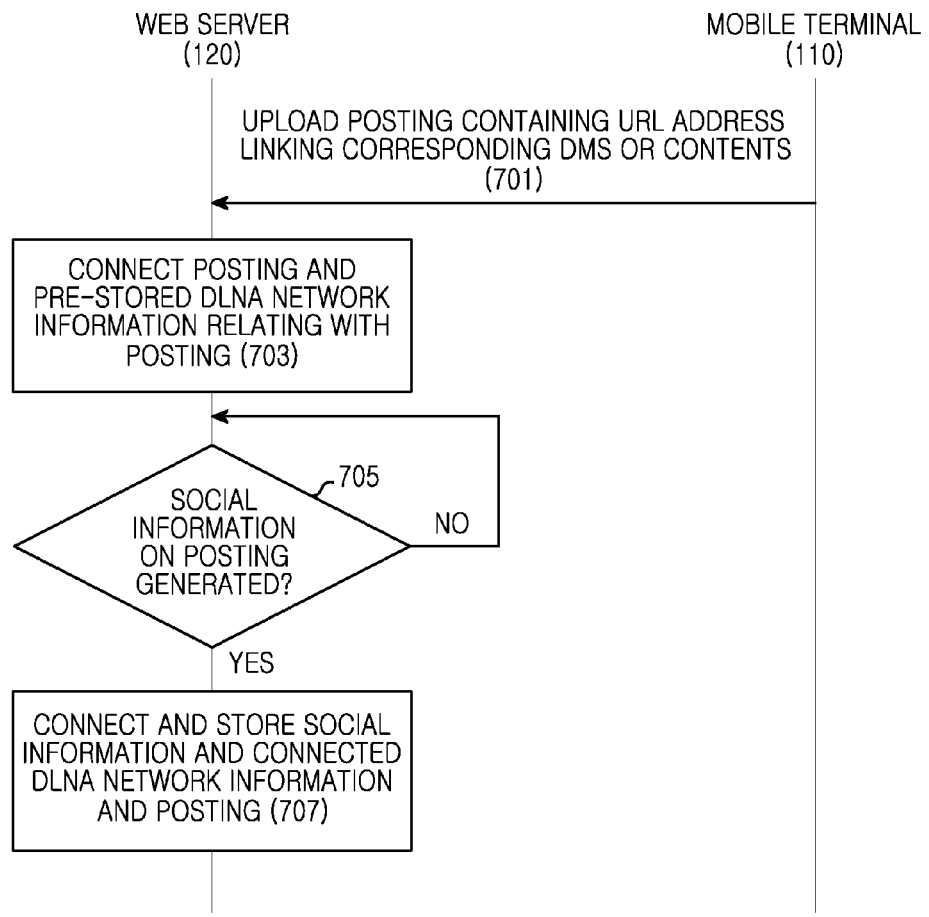
FIG. 7 illustrates communication in a DLNA-network information sharing system according to another embodiment of the present invention.

FIG. 7 illustrates communication in a DLNA-network information sharing system according to another embodiment of the present invention.

Referring to FIG. 7, in step 701, the mobile terminal 110 uploads a post including a URL address linking a corresponding DMS or content, to the web server 120.

In step 703, the web server 120 connects the uploaded post and pre-stored DLNA network information relating with the uploaded posting.

If social information about the posting is generated in step 705, the web server 120 links the social information and the connected DLNA network information and post and stores the linked information in step 707.

Using the social information, the web server 120 can provide an index of user satisfaction, reliability, and the like for a corresponding DLNA network and a post. For example, if an average of evaluation grades put by users on a post is equal to or greater than a threshold value, a web site adds a grade of a satisfaction or reliability for the post and a DLNA network connecting with the post. The grade of the satisfaction or reliability for the DLNA network is in line with a grade of a satisfaction or reliability for a corresponding DMS or content.

Further, if a new post is registered, the web server 120 searches for a similar post to the new post. Because the new post contains information about a corresponding DLNA network, the web server 120 can search for a post containing similar content to the new posting. If a similar post exists, the web server 120 increases a grade of a satisfaction or reliability for a corresponding DLNA network.

As described above, a DLNA-network information sharing system according to an embodiment of the present invention can share information of a corresponding DLNA network on the web.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A first mobile terminal comprising:
a communication unit configured to communicate within a Digital Living Network Alliance (DLNA) network and to communicate with a web server not included in the DLNA network; and
a controller configured to:
obtain, from the DLNA network, network information including location information about a location where the DLNA network is established, Digital Media Server (DMS) information about a DMS included in the DLNA network, and content information about digital media content managed by the DMS, and
transmit, via the communication unit, the obtained network information to the web server,
wherein the location information, the DMS information, and the content information are managed in the web server, and
wherein the DMS information and the content information are provided to a second mobile terminal that is not included in the DLNA network, based on the location information, when the second mobile terminal, accesses the web server and requests location-based searching.

2. The first mobile terminal of claim 1, wherein the DMS information includes a DMS identifier (ID), an Internet Protocol (IP) address, and an Access Point (AP) address related to the location information, and
wherein the content information includes a content ID and a description of the DMS ID.

3. The first mobile terminal of claim 1, wherein the DMS information and the content information provided to the second mobile terminal, in response to the request for the location-based searching, are provided with a map based on the location information.

4. The first mobile terminal of claim 1, wherein the DMS information and the content information provided to the second mobile terminal, in response to the request for the location-based searching, are provided with a Uniform Resource Locator (URL).

5. A web server that is not included in a Digital Living Network Alliance (DLNA) network, the web server comprising:
a communication unit configured to communicate with a first mobile terminal included in the DLNA network and a second mobile terminal that is not include in the DLNA network; and
a controller configured to:
obtain, from the first mobile terminal, network information including location information about a location where the DLNA network is established, Digital Media Server (DMS)information about a DMS included in the DLNA network, and content information about digital media content managed by the DMS,
manage the obtained network information,
receive, from the second terminal, a first request for location-based searching, and
provide the DMS information and the content information to the second mobile terminal, based on the location information, in response to the first request.

6. The web sever of claim 5, wherein the DMS information includes a DMS identifier (ID), an Internet Protocol (IP) address and an Access Point (AP) address related to the location information, and
wherein the content information includes a content ID and a description of the DMS ID.

7. The web server of claim 5, wherein the DMS information and the content information provided to the second mobile terminal, in response to the first request, are provided with a map based on the location information.

8. The web server of claim 5, wherein the DMS information and the content information provided to the second mobile terminal, in response to the first request, are provided with a Uniform Resource Locator (URL).

9. The web server of claim 5, wherein the controller is further configured to:
receive, from the second mobile terminal, social information including user opinions about the network information, the user opinion being input via the second mobile terminal; and
manage the network information and the social information.

10. The web server of claim 9, wherein the controller is further configured to:
receive, from a third terminal that is not included in the DLNA network, a second request for the location-based searching; and
provide the DMS information, the content information, and the social information to the third mobile terminal, in response to the second request.

11. A method of a first mobile terminal included in a Digital Living Network Alliance (DLNA), the method comprising:
obtaining, from the DLNA network, network information including location information about a location where the DLNA network is established, Digital Media Server (DMS) information about a DMS included in the DLNA network, and content information about digital media content managed by the DMS; and
transmitting the obtained network information to a web server that is not included in the DLNA network,
wherein the location information, the DMS information, and the content information are managed by the web server, and
wherein the DMS information and the content information are provided to a second mobile terminal that is not included in the DLNA network, based on the location information, when the second mobile terminal accesses the web server and requests location-based searching.

12. The method of claim 11, wherein the DMS information includes a DMS identifier (ID), an Internet Protocol (IP) address, and an Access Point (AP) address related to the location information, and
wherein the content information includes a content ID and a description of the DMS ID.

13. The method of claim 11, wherein the DMS information and the content information provided to the second mobile terminal, in response to the request for the location-based searching, are provided with a map based on the location information.

14. The method of claim 11, wherein the DMS information and the content information provided to the second mobile terminal, in response to the request for the location-based searching, are provided with a Uniform Resource Locator (URL).

15. A method of a web server that is not included in a Digital Living Network Alliance (DLNA) network, the method comprising:
obtaining, from a first mobile terminal that is included in that DLNA, network information including location information about a location where the DLNA network is established, Digital Media Server (DMS) information about a DMS that is included in the DLNA network, and content information about digital media content managed by the DMS;

managing the network information received from the first mobile terminal;

receiving, from a second terminal that is not included in the DLNA network, a first request for location-based searching; and providing the DMS information and the content information to the second mobile terminal, based on the location information, in response to the first request.

16. The method of claim 15, wherein the DMS information includes a DMS identifier (ID), an Internet Protocol (IP) address, and an Access Point (AP) address related to the location information, and wherein the content information includes a content ID and a description of the DMS ID.

17. The method of claim 15, wherein the DMS information and the content information provided to the second mobile terminal, in response to the first request, are provided with a map based on the location information.

18. The method of claim 15, wherein the DMS information and the content information provided to the second mobile terminal, in response to the first request, are provided with a Uniform Resource Locator (URL).

19. The method of claim 15, further comprising:

receiving, from the second mobile terminal, social information including user opinions about the network information, the user opinions being input via the second mobile terminal; and managing the network information and the social information.

20. The method of claim 19, further comprising:

receive, from a third terminal that is not included in the DLNA network, a second request for the location-based searching; and providing the DMS information, the content information, and the social information to the third mobile terminal, based on the location information, in response to the second request.

* * * * *